US012807740B2

(12) United States Patent
Karppi et al.

(10) Patent No.: US 12,807,740 B2
(45) Date of Patent: Nov. 24, 2026

(54) METHOD FOR ON-SITE GLYOXYLATION OF POLYACRYLAMIDE

(71) Applicant: KEMIRA OYJ, Helsinki (FI)

(72) Inventors: Asko Karppi, Espoo (FI); Matti Hietaniemi, Espoo (FI); Giorgio Vanzetti, San Giorgio di Nogaro (IT); Jonas Konn, Espoo (FI); Tomi Kempas, Espoo (FI)

(73) Assignee: KEMIRA OYJ, Helsinki (FI)

( * ) Notice: Subject to any disclaimer, the term of this patent is extended or adjusted under 35 U.S.C. 154(b) by 461 days.

(21) Appl. No.: 18/688,022

(22) PCT Filed: Sep. 21, 2022

(86) PCT No.: PCT/FI2022/050632

§ 371 (c)(1),
(2) Date: Feb. 29, 2024

(87) PCT Pub. No.: WO2023/047020

PCT Pub. Date: Mar. 30, 2023

(65) Prior Publication Data

US 2024/0360253 A1 Oct. 31, 2024

(30) Foreign Application Priority Data

Sep. 22, 2021 (FI) ..................................... 20215992

(51) Int. Cl.
*C08F 8/28* (2006.01)
*D21H 17/45* (2006.01)
*D21H 21/18* (2006.01)

(52) U.S. Cl.
CPC ............. *C08F 8/28* (2013.01); *D21H 17/455* (2013.01); *D21H 21/18* (2013.01); *C08F 2810/10* (2013.01)

(58) Field of Classification Search
CPC ...... D21H 17/06; D21H 17/375; D21H 17/38; D21H 17/455; D21H 21/18; D21H 21/20; C08F 8/28; C08F 220/56; C08F 2810/10
See application file for complete search history.

(56) References Cited

U.S. PATENT DOCUMENTS

2005/0187356 A1 8/2005 Hagiopol et al.
2008/0064819 A1* 3/2008 Wright ...................... C08F 8/28 525/383
2017/0002519 A1 1/2017 Rosencrance et al.
2017/0306065 A1 10/2017 Kerman

FOREIGN PATENT DOCUMENTS

WO 2009/059725 A2 5/2009
WO 2016/061417 A2 4/2016
WO 2017005562 A1 1/2017
WO 2018122443 A1 7/2018
WO 2021/186109 A1 9/2021

OTHER PUBLICATIONS

Search Report issued by the Chinese Application No. 202280062456.3, mailed Dec. 26, 2025.
International Search Report and Written Opinion in Application No. PCT/FI2022/050632, mailed Dec. 15, 2022, 16 pages.
Finnish Search Report in Application No. 20215992, dated Apr. 8, 2022, 1 page.

* cited by examiner

*Primary Examiner* — Christopher M Rodd
(74) *Attorney, Agent, or Firm* — Meunier Carlin & Curfman LLC

(57) ABSTRACT

Method for on-site glyoxylation of polyacrylamide in paper mill, board mill or the like is disclosed. Discontinuous batch glyoxylation reaction of aqueous reaction mixture is performed. The method comprises forming or obtaining the aqueous reaction mixture having a start viscosity and comprising polyacrylamide base polymer having weight average molecular weight of 30 000-300 000 g/mol and glyoxal. Concentration of the polyacrylamide base polymer in the reaction mixture is 1.5-8% above a Critical Concentration of the polyacrylamide base polymer. A feed of an alkali is added to the reaction mixture while measuring viscosity of the reaction mixture and/or a process variable related to the viscosity of the reaction mixture and the on-site glyoxylation reaction of polyacrylamide base polymer in the reaction mixture is allowed to proceed. When a predetermined end viscosity value is attained the feed of alkali is ended and acid is added to the reaction mixture.

15 Claims, No Drawings

METHOD FOR ON-SITE GLYOXYLATION OF POLYACRYLAMIDE

CROSS REFERENCES

This is a U.S. national stage filing of the international application number PCT/F12022/050632 filed on Sep. 21, 2022 claiming priority to Finnish national application number 20215992 filed on Sep. 22, 2021.

FIELD OF THE INVENTION

The present invention relates to a method for on-site glyoxylation of polyacrylamide in a paper mill, board mill or the like according to the preambles of the enclosed independent claim.

BACKGROUND

Board, especially corrugated container board, is one of the most used packaging materials in the world due to its low price, light-weight structure, and recyclability. However, container boards also have limitations. One of the major drawbacks of the container board is its poor water and moisture resistance. The main building blocks of the container board are amphiphilic cellulose-based fibres whose hydrophilic hydroxyl groups impart mechanical strength to the fibres, but at the same time make them susceptible to moisture. This means that in humid conditions the strength of the board may rapidly deteriorate.

Many goods are nowadays produced in countries with humid environmental conditions, e.g. in Southeast Asia, from where they are shipped all over the world. Corrugated containerboard is also used for packaging of moist or humidity creating goods, such as fruits, vegetables or frozen food products, and/or stored in humid environments, e.g. in cooled storage spaces. As the packages are exposed to humidity from the environment or from the packed goods during the transport and/or storage, the strength of packages is reduced. In the end this may even result in collapse of the packages. Consequently, there is an increased need for providing improved strength properties for container board and equivalent fibre products, even in humid conditions.

Another challenge in packages produced from corrugated container board is the so-called score cracking. Score cracking refers to the fibre dislocation on the outside of container board along the score line on the edge area of the package. The outside surface of the container board is subjected to stretching when the folding along the score line is made. Surface sizing may improve the tensile strength of the board, but the board may become brittle because strain is not increased. Score cracking is a quality defect and its occurrence should be minimised in manufacture of packages from board and the like.

Glyoxylated polyacrylamide (GPAM) and compositions comprising glyoxylated polyacrylamide are commonly used in manufacture of paper, board or the like for improving the properties of the final product. Polyacrylamide polymers may be formed by polymerising acrylamide and cationic monomers, which are able to create ionic linkages with anionic fibre surfaces. Molecular weight, i.e. length, of polyacrylamide backbone is an important parameter for the polymer function, as a long backbone provides sufficient dimensions that allow bonding and linkages between the fibre surfaces. Glyoxylation makes the polyacrylamide polymer crosslinked. Crosslinked structure improves drainage and dewatering ability of the polyacrylamide and has less negative impact on sheet formation compared to linear polyacrylamide polymer of similar molecular weight.

Glyoxylated polyacrylamide is a reactive polymer that can covalently bind with cellulose, and thus provides improvement e.g. in strength properties. For example, dry strength and/or wet strength properties of paper and board can be improved by addition of glyoxylated polyacrylamide to the stock suspension. In general, good formation and good bonding ability provided by the glyoxylated polyacrylamide are beneficial for the strength properties of the final paper or board, measured by ring crush test (RCT), bursting strength and Concora medium test (CMT). These strength describing parameters are important especially in manufacture of liner, testliner or fluting board grades.

High molecular weight glyoxylated polyacrylamide is advantageous for the strength properties of paper or board, especially if the paper or board is manufactured from furnish comprising recycled fibres. In these cases, one of the challenges is often the high ash content of the furnish, which requires high enough molecular weight from the backbone of the polyacrylamide polymer. Otherwise the inorganic particles between the fibres may obstruct the bond formation and the glyoxylated polyacrylamide does not effectively come into contact with the fibres and form linkages between them. Therefore, the physical size, i.e. molecular weight, of the glyoxylated polyacrylamide polymer has significance for the strength improvement efficiency.

However, glyoxylated polyacrylamide compositions, especially high molecular weight polyacrylamide compositions, have challenges in their commercial use. It is known that the glyoxylated polyacrylamide may have an inadequate storage stability. As stated above, glyoxylated polyacrylamide is formed by crosslinking polyacrylamide-based polymers by using glyoxal. The obtained glyoxylated polyacrylamide polymers are not fully stable, as glyoxal in the aqueous polymer solution tends to continue cross-linking reaction with the polyacrylamide base polymer. This means that the viscosities of the aqueous GPAM solutions usually increase during storage as the cross-linking reaction proceeds. In the end the continuing cross-linking reaction may even lead to gel-formation and render the glyoxylated polyacrylamide unsuitable for use in manufacture of paper, board and the like. Thus, the glyoxylated polyacrylamide and its aqueous solutions have limited shelf-life.

Increasing the molecular weight of the polyacrylamide base polymer for the desired strength performance may lead to extensive gel formation. In order to reduce the risk for cross-linking and gel formation, glyoxylated polyacrylamide polymers are thus often manufactured, transported and stored in form of aqueous solutions, which have fairly low concentration of active glyoxylated polyacrylamide polymer, e.g. 5-7 weight-%. This means that the transportation and storage costs of glyoxylated polyacrylamide compositions are relatively high due to large volumes involved.

Due to the limitations in its storage stability, the glyoxylated polyacrylamide polymers, especially high molecular weight glyoxylated polyacrylamide polymers, are sometimes manufactured on-site at a paper or board mills just before the addition to the process. Some continuous and discontinuous methods for manufacturing glyoxylated polyacrylamide on-site have been suggested.

For example, US 2008/0064819 discloses a method for preparing a cellulose reactive functionalized polyvinylamide adduct, where the concentration of the vinylamide polymer is below, equal to or no more than 1% above a Critical Concentration. The Critical Concentration is defined as the concentration of the vinylamide polymer above which Critical Concentration the viscosity increases for the reaction mixture resulting for the forward progress of the adduct formation and below which Critical Concentration the viscosity decreases for the reaction mixture resulting from the forward progress of the adduct formation. Turbidity measurement is used to follow the glyoxylation reaction.

The on-site manufacture of glyoxylated polyacrylamide, however, has shown to be complicated in practice. There has been challenges in continuous processes to manufacture glyoxylated polyacrylamide with consistent acceptable quality, while maintaining the throughput of the process on an adequate level, i.e. keeping the reaction time short enough for industrial production. Especially the control of the various process parameters and conditions has been complex. For example, an accurate pH control in industrial scale requires expensive technique, like ceramic pH meters, as well as continuous maintenance.

Conventionally present on-site glyoxylated polyacrylamide products are processed at about 2 wt-% concentration. The relatively low polymer concentration employed in on-site manufacture demand large production units to produce the amounts of glyoxylated polyacrylamide required by large board or mills paper mills. The available amount of free space at paper and board mills is though limited and may become an obstacle for on-site glyoxylation. When low polymer concentration requires large amounts of purified water, the size of the water purification units also increase, and accentuate the problems associated with available free space at the mills. High freshwater intake will also automatically increase the amount of produced effluent water. Allowable effluent water amount is typically limited by the environmental permission of the mill and may become a limiting factor for water consumption.

Furthermore, the available amount of water for glyoxylation reaction may be limited and the water quality may be relatively low, and the seasonal changes in water quality may be large. Poor water quality may complicate or even prevent the use of turbidity measurements for following the glyoxylation reaction. In addition, poor water quality, such as high hardness, high alkalinity or high concentration of colloidal material, requires introduction of a purification stage to the manufacturing process. In some geographical locations raw water used at the mill has so high hardness and alkalinity that it cannot be used for manufacture of glyoxylated polyacrylamide. The only available water for on-site glyoxylation is then usually boiler feed water coming from the condensate of the steam system of the mill, but the amount of this clean water is usually very limited.

SUMMARY OF THE INVENTION

An object of this invention is to minimise or possibly even eliminate the disadvantages existing in the prior art.

Another object of the present invention is to provide a simple, robust and effective method for on-site production of glyoxylated polyacrylamide.

Yet another object of the present invention is to provide a method for producing on-site glyoxylated polyacrylamide which is easy to control and where water consumption is reduced.

These objects are attained with the invention having the characteristics presented below in the characterising parts of the independent claims. Some preferred embodiments of the invention are presented in the dependent claims.

The embodiments mentioned in this text relate, where applicable, to all aspects of the invention, even if this is not always separately mentioned.

In a typical method according to the present invention for on-site glyoxylation of polyacrylamide in a paper mill, board mill or the like, where a discontinuous batch glyoxylation reaction of an aqueous reaction mixture is performed in a reactor vessel provided with a driven agitator to form an aqueous polymer composition comprising glyoxylated polyacrylamide for use in a manufacturing process of paper, board or the like, the method comprising:

- forming or obtaining the aqueous reaction mixture having a start viscosity value and comprising polyacrylamide base polymer having a weight average molecular weight of 30 000-300 000 g/mol and glyoxal, wherein the concentration of the polyacrylamide base polymer in the reaction mixture is 1.5-8% units, preferably 2-8% units, above a Critical Concentration of the polyacrylamide base polymer;
- optionally adjusting the reaction mixture's temperature to a temperature range of 15-40° C., more preferably 20-30° C.;
- adding to the reaction mixture a feed of an alkali while measuring viscosity of the reaction mixture and/or a process variable that is related to the viscosity of the reaction mixture;
- allowing the on-site glyoxylation reaction of polyacrylamide base polymer in the reaction mixture to proceed;
- ending the feed of the alkali when a predetermined end viscosity value is attained;
- adding acid to the reaction mixture; and
- removing the aqueous polymer composition comprising glyoxylated polyacrylamide from the reaction vessel.

Typical use of glyoxylated polyacrylamide prepared according to the method according to the invention is in a manufacture of paper, board, preferably in amount of 0.5-3 kg/t.

Now it has been surprisingly found that no complicated and/or time consuming on-line pH measurements or turbidity measurements are required for proper control of the on-site glyoxylation reaction of polyacrylamide. The progress of the glyoxylation process can be efficiently controlled by using simple measurement of viscosity and/or viscosity related parameter(s) without complex measurement protocols involving variety of different parameters and/or on-line pH sensors, such as pH meters. The present method can be performed by using equipment usually already existing in the paper and board mills, which makes the method suitable and easily adaptable in practice.

Furthermore, it has been observed that concentration of the polyacrylamide base polymer may be increased in the reaction mixture, which enables reduction in water amount needed for producing glyoxylated polyacrylamide.

DETAILED DESCRIPTION

The aqueous polymer composition comprising glyoxylated polyacrylamide obtainable by the present invention enables the increase of short-span compression strength (SCT strength) of paper, board or the like especially in high humidity conditions. Thus the invention can provide the final paper or board with properties, which make them suitable for packages intended for demanding environments and/or for demanding goods, such as fruits or frozen foods. Use of the aqueous polymer composition comprising glyoxylated polyacrylamide obtainable by the present invention may also help to reduce the weight of packages and thereby reduce $CO_2$-emissions associated with the packaging and transportation. SCT strength in high humidity conditions is especially needed for fluting to reduce the risk of package collapse during storage and/or transport.

The aqueous polymer composition comprising glyoxylated polyacrylamide obtainable by the present invention also reduce the risk for score cracking. It has been observed that the aqueous polymer composition comprising glyoxylated polyacrylamide obtainable by the present invention can significantly increase the tensile energy adsorption (TEA) of paper, board or the like. In this manner it is possible to produce liner and/or testliner board which has improved strength properties and which is able to withstand stretching when the board is folded along the score line during package production.

In the present context the terms "humid conditions" and "high humidity conditions" are used interchangeably, and they denote environmental conditions with high humidity, where relative humidity is 80%, preferably 85%, more preferably ≥90%. For example, in high humidity conditions the relative humidity (RH) may be 80-100%. The tests for evaluating high humidity properties, e.g. SCT strength in high humidity, may be performed for example with test stripes which are air conditioned at least 4 hours at 85% RH and 23° C. High humidity conditions typically increase the moisture content of paper or board web to >7%, which decreases the amount of hydrogen bonds between the web constituents. If no countermeasures are taken, such as the present invention, this may lead to decreased web strength.

The weight average molecular weights of the base polymers for the present purposes are measured by using SEC/GPC determination with PEO (polyethyleneoxide) calibration. The weight average molecular weight Mw is determined by size-exclusion chromatography (SEC) using Agilent 1100 SE chromatography equipment with integrated pump, autosampler and degasser. Eluent is a buffer solution (0.3125 M $CH_3COOH$+ 0.3125 M $CH_3COONa$) with a flow rate of 0.5 ml/min at 35° C. Typical sample concentration is 2-4 mg/ml, with an injection volume of 50 µl. Ethylene glycol (1 mg/ml) is used as a flow marker. Column set consists of three columns (a TSKgel PWXL guard column and two TSKgel GMPWXL columns). Refractive index detector by Agilent is used for detection (T=35° C.). Molecular weight is determined using conventional (column) calibration with poly(ethylene oxide)/poly(ethylene glycol) narrow molecular weight distribution standards (Polymer Standards Service).

In the present invention the on-site glyoxylation of polyacrylamide in a paper mill, board mill or the like is performed as a discontinuous batch glyoxylation reaction of an aqueous reaction mixture in a reactor vessel provided with a driven agitator. The term "discontinuous batch glyoxylation reaction" denotes that the reaction mixture materials, e.g. polyacrylamide base polymer, glyoxal, water, etc., are introduced to a reaction vessel in the beginning of the glyoxylation process, and the formed reaction mixture remains in the reaction vessel until the reaction is ended. During the glyoxylation reaction an aqueous polymer composition comprising glyoxylated polyacrylamide is formed. The formed aqueous polymer composition comprising glyoxylated polyacrylamide polymer is then removed from the reaction vessel. The reaction cycle for the discontinuous batch glyoxylation reaction starts when a batch of reaction mixture materials is introduced to the reaction vessel, including possible temperature adjustment time or the like, and the reaction cycle ends when the reaction vessel is ready to receive a following batch of reaction mixture materials after the removal of the aqueous polymer composition from reaction vessel, including necessary emptying time and flushing time. In the present invention the reaction cycle may be less than 130 min, preferably less than 120 min, more preferably less than 100 min. For example, the reaction cycle time may be 20-130 min or 20-120 min, preferably 30-100 min, more preferably 35-90 min or 45-90 min, sometimes even 40-75 min, which enables effective production of glyoxylated polyacrylamide for use in a paper mill, board mill or the like.

In the beginning of the glyoxylation reaction an aqueous reaction mixture comprising at least a polyacrylamide base polymer having a weight average molecular weight of 30 000-300 000 g/mol and glyoxal is obtained or formed into the reaction vessel. According to one embodiment the reaction mixture is formed by separately dosing or metering appropriate amounts of reaction mixture materials including polyacrylamide base polymer, glyoxal and dilution water into the reaction vessel. Alternatively and preferably, a pre-mixture comprising polyacrylamide base polymer and glyoxal may be used. The pre-mixture may be produced on-site, for example by arranging a static mixer before the batch reactor, and feeding the reaction mixture materials, i.e. water, base polymer, glyoxal, simultaneously via the static mixer to the batch reactor. Use of on-site produced pre-mixture may shorten the reaction cycle time and make the process more efficient. Alternatively, the pre-mixture comprising polyacrylamide base polymer and glyoxal may be prepared off-site and deliver ready-mixed. The use of a ready-mixed pre-mixture may sometimes be more convenient as the handling of concentrated glyoxal solution can then be avoided.

The concentration of the polyacrylamide base polymer in the reaction mixture is 1.5-8% units, preferably 2-8% units, more preferably 3-7% units, above a Critical Concentration of the polyacrylamide base polymer. This means that if a Critical Concentration is, for example, 2 weight-%, then 1.5% units above 2 weight-% would be 3.5 weight-%. Even relatively small increase in the concentration of polyacrylamide base polymer makes it possible in practice to significantly reduce the overall water consumption of the glyoxylation reaction. This provides unexpected advantages, especially in situations where freshwater availability is strongly limited, e.g. during summer months and/or drought periods. The Critical Concentration is defined in the manner disclosed in US 2008/0064819. The Critical Concentration is defined as the concentration of the polyacrylamide base polymer above which Critical Concentration the viscosity increases for the reaction mixture resulting for the forward progress of the glyoxylation of the polyacrylamide and below which Critical Concentration the viscosity decreases for the reaction mixture resulting from the forward progress of the glyoxylation of polyacrylamide. The Critical Concentration of glyoxylation of a particular polyacrylamide base polymer can be determined empirically through studies involving glyoxylation of polyacrylamide base polymer as described in US 2008/0064819.

Surprisingly, when the concentration of the polyacrylamide base polymer in the reaction mixture is 1.5-8% units, preferably 2-8% units, more preferably 3-7% units, above a Critical Concentration of the polyacrylamide base polymer, the glyoxylation reaction can be performed without extensive risk for gel formation, while operating in a concentration range which provides appropriate viscosity increase for control of the reaction.

A feed of an alkali is added the reaction mixture while measuring the viscosity of the reaction mixture and/or a process variable value that is related to the viscosity of the reaction mixture. The feed of alkali may be added as a continuous feed or the feed of the alkali may be added portionwise in two or more portions. The feed of alkali may be constant, i.e. the volume of alkali in the continuous feed remains the same during the whole feed period, or the feed may be variable, i.e. the volume of alkali may decrease or increase during the feed period. When added portionwise the individual portions may all have equal volume or the volume of the individual portions may increase or decrease during the feed period. It is also possible that the time interval between individual portions may be the same during the whole feed period or it may increase or decrease during the feed period.

The feed period for the feed of alkali may preferably be at most 120 minutes. The feed period denotes the time which starts when the addition of the feed of the alkali to the reaction mixture starts and which ends when the feed of the alkali ends. Usually it is desired that the feed period is not too long, which enables effective industrial on-line process. The feed period for the feed of the alkali in on-site glyoxylation reaction may be in a range of 5-120 minutes or 10-100 minutes, preferably 15-80 minutes, more preferably 20-60, even more preferably 20-50 minutes.

Typically, NaOH is used as alkali.

According to one preferable embodiment of the invention, the feed of the alkali is added in amount of 40-500 g NaOH, preferably 50-300 g NaOH or 100-200 g NaOH, given as active per metric ton of the reaction mixture, i.e. the total added amounts of water, polyacrylamide base polymer and glyoxal. It has been observed that this provides appropriate reaction speed for the glyoxylation reaction: too slow alkali feed may decrease reaction speed of the glyoxylation reaction, whereas too fast alkali feed increases gelling risk during the glyoxylation reaction.

According to one preferable embodiment the feed of the alkali may be added at a feed speed of 40-500 g NaOH, preferably 50-300 g NaOH or 100-200 g NaOH, given as active per hour per metric ton of the reaction mixture, i.e. the total added amounts of water, polyacrylamide base polymer and glyoxal.

When the feed of the alkali is started, the glyoxylation reaction, i.e. crosslinking of the polyacrylamide base polymer, begins and the on-site glyoxylation reaction of polyacrylamide base polymer in the reaction mixture is allowed to proceed. During the feed of the alkali the viscosity of the reaction mixture and/or the process variable value that is related to the viscosity of the reaction mixture is measured and followed, preferably on-line. The viscosity and/or viscosity related process variable provide more reliable way of controlling the glyoxylation reaction than for example pH measurements. For example viscometers do not need frequent calibration or are as prone to drift as pH meters. Viscosity related measurements are not sensitive for water quality, either. For example, hardness or colloidal material concentration of the used water does not impact the viscosity, even if they seriously disturb conventional turbidity measurements. The measurement(s) of the viscosity and/or viscosity related process variable can be continuous, or they can be performed at preselected, preferably short, time intervals. The obtained measurement values are used in determining the proper end point for the feed of the alkali and for the glyoxylation reaction, i.e. when the desired crosslinking level is reached.

According to one preferable embodiment of the invention the viscosity of the reaction mixture is measured indirectly by measuring a process variable value that is related to the viscosity of the reaction mixture. For example, the viscosity of the reaction mixture can be estimated, measured or determined by measuring torque and/or power consumption of the motor-driven agitator of the reaction vessel, preferably the torque of the driven agitator. When the viscosity of the reaction mixture increases, the power consumption of the driven agitator and the torque increases. Measuring the power consumption and/or torque of the driven agitator provides easy and reliable way to indirectly monitor and measure the viscosity change of the reaction mixture without complicated sensor systems or the like.

Alternatively, or in addition, the viscosity of the reaction mixture may be measured from the reaction mixture by using rotational viscometer, oscillating viscometer or vibrational viscometer. It is also possible to measure the power consumption or torque of the driven agitator and the viscosity of the reaction mixture by using one of the said viscometers.

The on-site glyoxylation of polyacrylamide base polymer in the reaction mixture is allowed to proceed until the pre-determined end viscosity value or viscosity level is attained. The feed of the alkali is ended when a predetermined end viscosity value or a predetermined process variable value that is related to the viscosity of the reaction mixture is attained, which means that the end point for the feed of the alkali is determined solely by the measured viscosity of the reaction mixture and/or the process variable that is related to the viscosity of the reaction mixture. In this manner it possible to avoid problems associated with use of on-line pH meters, whose reliability can sometimes be inadequate and/or unreliable. Furthermore, as the glyoxylation reaction is not controlled by a pH measurement, the reaction cycle time can be significantly reduced, providing an improved efficiency for on-line glyoxylation. Furthermore, in the present method, no alkali consumption of the reaction mixture is determined before the feed of the alkali is added to the reaction mixture. The amount of the feed of the alkali is solely determined on basis of the viscosity of the reaction mixture and/or the process variable that is related to the viscosity of the reaction mixture. Because no additional determination, e.g. by titration, or calculation of the alkali consumption is necessary, the method is significantly faster without deterioration of the properties of the glyoxylated polyacrylamide polymer that is obtained.

According to one embodiment of the invention the feed of the alkali is preferably ended when the viscosity of the reaction mixture is increased at least 20%, preferably at least 40%, more preferably at least 50%, even more preferably at least 70%, from the start viscosity value. The increase in the viscosity may be in the range of 20-250%, preferably 40-200%, more preferably 50-170%, even more preferably 70-150%, from the start viscosity value. This means that the viscosity value of the reaction mixture, at the moment of time when the feed of the alkali is ended, is at least 20%, preferably at least 40%, more preferably at least 50%, even more preferably at least 70%, higher than the start viscosity value of the reaction mixture.

After ending of the feed of the alkali, the glyoxylation reaction may still proceed but the speed of the glyoxylation reaction decreases. This is beneficial at the later stage of the glyoxylation reaction, as it provides more time to react to the fast increase of the viscosity of the reaction mixture, occurring at the end of the glyoxylation reaction, and makes the measurement or the estimation of the end viscosity more accurate.

An acid is added to the reaction mixture after ending the feed of the alkali. The acid may be added immediately after the feed of the alkali is ended or after a certain time period after the end of the feed of the alkali, during which the glyoxylation reaction is still allowed to progress. The acid is added in amount that provides for lowering the pH value of the reaction mixture to pH 58, preferably 57, more preferably 55, when a predetermined end viscosity value or level is attained. The lowering of the pH effectively ends the progress of the glyoxylation reaction and the crosslinking of the polyacrylamide chains practically stops or at least decreases significantly. The pH value of the reaction mixture may be lowered to a pH range of 2.5-5, preferably 3-4. The pH is lowered by an addition of an acid, such as formic acid or sulphuric acid, to the reaction mixture.

If desired, the pH value for the reaction mixture may be measured during the alkali feed, but it is not necessary. Typically the feed of the alkali leads to the adjustment of the pH value of the reaction mixture from a start pH value to a reaction pH value which resides in the range of pH 8-10, preferably 8.5-9.5, sometimes 8.7-9.5, without pH control or pH measurement(s). The pH of the reaction mixture before the feed of the alkali, i.e. start pH, is $<8$.

According to one preferable embodiment of the invention, the method, and especially the step of feeding of the alkali, is free of pH measurement. This means that no on-line pH control of the reaction mixture is present during the feeding of the alkali or during the glyoxylation reaction. The feed of alkali or the progress of the glyoxylation reaction are performed without simultaneous control of the pH of the reaction mixture.

The reaction mixture is effectively mixed by the driven agitator during the feed of the alkali to the reaction mixture, and the mixing is continued throughout the glyoxylation reaction. The reaction vessel typically has relatively small reactor volume of $\leq 8\ m^3$, preferably $\leq 7\ m^3$, more preferably $\leq 6\ m^3$ or $\leq 5\ m^3$, sometimes even more preferably $\leq 4\ m^3$. The reactor volume may be, for example, in the range of 0.5-8 $m^3$, preferably 0.75-7 $m^3$, more preferably 1-6 $m^3$ or 1-4 $m^3$. In some embodiments, the reactor volume may be 4-8 $m^3$, preferably 5-7 $m^3$. The relatively small reactor volume makes it possible to provide an effective mixing of the reaction mixture with conventional driven agitators for industrial use. Furthermore, the relatively small reaction vessel is easier to fit to on-site on a paper or board mill. It is possible even to make the reaction vessel movable. For example, it can be fitted on a transport pallet and moved with a forklift.

Preferably the reaction vessel does not contain any by-pass circuits that would circulate the reaction mixture or part of it outside the reaction vessel before the end of the glyoxylation reaction. The reaction vessel is thus free of by-pass circuits or the like. It is possible to perform the required measurements, if any, from the reaction mixture residing in the reaction vessel, which means that there is no need for by-pass circuits from which the process samples are removed. This is a clear advantage, as the by-pass circuits or the like are often complicated to maintain in the industrial production of glyoxylated polyacrylamide polymers.

The temperature of the reaction mixture may optionally be adjusted to a temperature range of 15-45° C. or 15-40° C., preferably 20-40° C., more preferably 20-35° C. or 20-30° C. According to one embodiment the temperature of the reaction mixture may be adjusted to 15-35° C. preferably 17-30° C. more preferably 18-25° C. or 20-22° C. The adjustment of the reaction mixture temperature provides the glyoxylation reaction with increased stability. The adjustment of temperature can be done either before the start of the feed of the alkali, i.e. before the start of the glyoxylation reaction, and/or during the glyoxylation reaction. The temperature adjustment can be achieved by using a reaction vessel that can be cooled/heated. Another alternative to adjust the temperature of the reaction mixture is the addition of hot or cold water to the reaction mixture. For example, the water which is used to form the reaction mixture may be heated or cooled to a suitable temperature. According to one embodiment of the invention the temperature of the reaction mixture is measured during the glyoxylation reaction, for example by using standard temperature sensor(s) fitted in suitable location(s) in the reaction vessel. Preferably the temperature of the reaction mixture may be measured and adjusted throughout the glyoxylation reaction.

After addition of the acid the viscosity of the reaction mixture may be in a range of 20-60 cP or 20-50 cP, preferably 25-40 cP, more preferably 25-35 cP. consequently, the viscosity of the reaction mixture may usually be in the range of 6-100 cP. This viscosity value provides an appropriate crosslinking level without risking any gel formation. The viscosity value for the reaction mixture after addition of the acid is at least two times the start viscosity of the reaction mixture and at most nine times the start viscosity of the reaction mixture. Preferably the viscosity of the reaction mixture after addition of the acid may be 1.5-10, preferably 2-7, more preferably 2-5, even more preferably 2.5-5, times the start viscosity of the reaction mixture. The start viscosity of the reaction mixture can be determined by one of the measuring methods known as such and/or described elsewhere in this application, immediately before the addition of the feed of the alkali to the reaction mixture. According to one embodiment of the invention the start viscosity of the reaction mixture may be in a range of 4-15 cP, preferably 6-12 cP, more preferably 7-10 cP.

The formed aqueous polymer composition comprising glyoxylated polyacrylamide is removed from the reaction vessel after the addition of acid. The formed polymer composition comprising glyoxylated polyacrylamide may be removed from the reaction vessel immediately or after a suitable storage time, preferably immediately. The glyoxylated polyacrylamide may be used in the production of paper, board or the like immediately after the glyoxylation reaction is ended or the glyoxylated polyacrylamide may be first stored, either in the reaction vessel or in a separate storage vessel. According to one embodiment of the invention the glyoxylated polyacrylamide may be stored for 0.1-100 h, preferably 0.5-10 h, before its use in the production of paper, board or the like.

According to one preferable embodiment of the present invention the aqueous polymer composition comprising glyoxylated polyacrylamide is transferred from the reaction vessel by a piping via optional storage vessels to the manufacturing process of paper, board or the like, preferably directly after end of the glyoxylation reaction. The obtained aqueous polymer composition comprising glyoxylated polyacrylamide is used in a manufacturing process of paper, board or the like by dosing it to a fibre suspension before formation of web of paper, board, tissue or the like. Preferably the polymer composition is directly transferred by pumping through the pipeline to a fibre suspension which is formed into one or more layers of the final fibre products. Ability to use the obtained polymer composition directly is advantageous as it minimises the risk of gel formation, which may occur during long storage.

By using the present invention the glyoxal is effectively consumed in the glyoxylation reaction, and the obtained aqueous polymer composition comprises low amounts of residual glyoxal. The aqueous polymer composition comprising glyoxylated polyacrylamide preferably comprises 0.1-1.5 weight-%, preferably 0.2-1 weight-% and more preferably 0.2-0.99 weight-% of residual glyoxal, calculated from the total weight of the aqueous polymer composition.

The aqueous polymer composition comprising glyoxylated polyacrylamide, obtained by the present method, may have a viscosity of >20 mPas, preferably >25 mPas and/or <50 mPas, preferably <35 mPas, measured by using Brookfield viscometer at 25° C.

The present method enables the use of polyacrylamide base polymer with relatively high molecular weight. According to one embodiment of the present invention the polyacrylamide base polymer may have a weight average molecular weight in a range of 30 000-300 000 g/mol, preferably 50 000-300 000 g/mol, more preferably 90 000-250 000 g/mol, even more preferably 100 000-200 000 g/mol or 110 000-200 000 g/mol, sometimes from 155 000-200 000 g/mol. The weight average molecular weight of the base polymer may be, for example, 115 000-190 000 g/mol, preferably 120 000-170 000 g/mol, more preferably 130 000-160 000 g/mol. As explained above, usually the use of the high molecular weight polyacrylamide base polymer has been associated with great risk of gel formation during glyoxylation reaction, but the present method reduces or eliminates this risk. The higher the molecular weight of the base polymer, the larger the molecular size of the final crosslinked structure, where base polymer chains are crosslinked with glyoxal. Larger structure provides improved strength as well as dewatering properties, especially for furnish comprising recycled fibres and/or having a high ash content.

Preferably the polyacrylamide base polymer is cationic. The polyacrylamide base polymer may be obtained by polymerisation of acrylamide and 3-50 mol-%, 3-50 mol-%, preferably 3-35 mol-%, more preferably 7-30 mol-%, even more preferably 11-16 mol-%, of hydrolytically stable cationic monomers. According to one embodiment the polyacrylamide base polymer may be obtained by polymerisation of acrylamide and 6-8 mol-% or 11-14 mol-% of hydrolytically stable cationic monomers. For example, the polyacrylamide base polymer may be obtained by polymerisation of acrylamide and 11-17 mol-%, preferably 11-15 mol-%, of hydrolytically stable cationic monomers. It has been observed that when the amount of cationic monomers is around 10 mol-% the ash retention in the produced paper or board is increased, which reduces the strength effect obtained. According to one embodiment the cationic monomers may be selected from diallyldimethylammonium chloride (DADMAC), 3-(acrylamidopropyl)trimethylammonium chloride (APTAC), 3-(methacrylamidopropyl) trimethyl-ammonium chloride (MAPTAC), or any combination thereof. Preferably the cationic monomer is diallyldimethylammonium chloride (DADMAC). These cationic monomers, especially at described amounts, are able to provide hydrolytic stability for the reaction mixture.

According to one embodiment the reaction mixture may have a solids content of 3-8 weight-%, preferably 3-7 weight-%, preferably 4-6 weight-%, calculated from the total weight of the reaction mixture. The solid content of the reaction mixture may be, for example, 4.1-6.5 weight-%, preferably 4.4-6.5 weight-%, more preferably 4.4-6.0 weight-%. The solids content of the reaction mixture may be adjusted on proper level by addition of water to the reaction mixture, preferably before the addition of the calculated amount of alkali. A minimum solids content, i.e. concentration of the polyacrylamide base polymer is necessary for viscosity increase, which provides the preferred signal for ending the glyoxylation reaction.

The pH of the reaction mixture, before addition of the alkali, may be in the range from 2 to <8, preferably 3-7 and more preferably 3-6.

According to one embodiment of the invention the polyacrylamide base polymer and glyoxal are provided as a ready-made acidic pre-mixture for forming the reaction mixture. This means that no mixing of separate base polymer and glyoxal is necessary, which reduces handling of the hazardous glyoxal in the mill environment, thus improving the occupational safety. For example, the pre-mixture may comprise a polyacrylamide base polymer comprising at least 5 mol-% of cationic monomers and having a weight average molecular weight MW in the range of 50 000-350 000 g/mol, and 0.1-2 weight-% of glyoxal, calculated from the total weight of the aqueous prepolymer composition. Typically, the pH of the pre-mixture is in the range of 2-4, preferably 2.2-3.5 and more preferably 2.5-3.3. The crosslinking reaction of the pre-mixture is activated when the pH of the reaction mixture is adjusting to an alkaline pH.

According to one aspect, the invention relates also to an aqueous reaction mixture or reaction composition comprising a polyacrylamide base polymer and glyoxal. The composition comprises a polyacrylamide base polymer obtained by polymerisation of (meth)acrylamide and 10-25 mol-% or 10-18 mol-%, preferably 11-17 mol-%, more preferably 11-15 mol-%, of hydrolytically stable monomers, the base polymer having a weight average molecular weight in the range of 115 000-200 000 g/mol, preferably 115 000-190 000 g/mol, more preferably 120 000-170 000 g/mol or 130 000-160 000 g/mol; and 6-25 weigh-%, preferably 10-20 weight-%, more preferably 12-18 weight-% of glyoxal, calculated from the dry weight of the prepolymer composition. The suitable hydrolytically stable cationic monomers have been defined elsewhere in this application. This reaction mixture or reaction composition is suitable for use in the method of the present invention and provides a glyoxylated polyacrylamide, which provides improved strength and/or dewatering effects. The reaction mixture or reaction composition may have solid content in the range of 3-7 weight-%, preferably 4-6.5 weight-% and more preferably 4.5-6.5 weight-% or 4.5-6.0 weight-%.

The aqueous polymer composition comprising glyoxylated polyacrylamide prepared by the present invention is especially suitable for use as a dry strength and/or dewatering agent in manufacturing of paper or board. The aqueous polymer composition comprising glyoxylated polyacrylamide prepared by the present invention provides good dry strength and/or dewatering results particularly when used in manufacture of paper or board which comprise recycled fibres.

According to one preferable embodiment the aqueous polymer composition may be used in manufacture of paper or board for improving strength properties of paper or board in high humidity conditions. The composition is especially suitable for improving SCT strength or tensile energy adsorption of a paper or board.

According to one embodiment the aqueous polymer composition comprising glyoxylated polyacrylamide prepared by the present invention is especially suitable for use in manufacture of fibrous webs, which may have a basis weight (as dry) of at least 20 g/m$^2$, preferably at least 60 g/m$^2$, more preferably at least 80 g/m$^2$, even more preferably at least 100 g/m$^2$. For example, the basis weight of the fibrous web, as dry, may be in a range of 20-500 g/m$^2$, preferably 50-400 g/m$^2$, preferably 60-350 g/m$^2$ or sometimes even 100-200 g/m$^2$.

According to one embodiment, the invention is suitable for manufacture of a fibrous web, which forms a layer in a multi-layered board selected from testliner, kraftliner or corrugated medium. Testliners may comprise a layered structure comprising from two up to four plies, and/or have a basis weight in a range of 80-350 g/$m^2$. Corrugated medium may have a single-ply structure. The basis weight may in a range of 110-180 g/$m^2$.

Some embodiments of the invention are described more closely in the following non-limiting examples.

EXAMPLES

Example 1: On-Site Production of Glyoxylated Polyacrylamide, Continuous Feed of the Alkali Glyoxylated polyacrylamide was produced on-site in a unit which comprised a reactor vessel, pumps and feed lines for the polyacrylamide base polymer, glyoxal, sodium hydroxide and sulfuric acid. Process water feed line was connected to the unit. The reactor vessel had a volume of 1000 liters and it was equipped with Heidolph Hei-Torque Precision 400 mixer for torque monitoring. The reactor vessel was further equipped with Anton Paar L-Vis 510 on-line viscometer.

The polyacrylamide base polymer was in a form of an aqueous solution of a copolymer obtained by polymerising acrylamide and 14 mol-% of diallyldimethylammonium chloride. The weight average molecular weight Mw of the polyacrylamide base polymer was 150 000 g/mol and critical concentration about 1.5%. Dry content of the aqueous solution of the copolymer was 27.5 weight-%. Glyoxal was used as 40 weight-% aqueous solution. Sodium hydroxide was used as 50 weight-% aqueous solution. Sulfuric acid was used as 37 weight-% aqueous solution.

Original process water contained calcium about 150 mg/liter and the water was softened with an ion-exchange treatment before feeding to the reactor vessel for on-site production of glyoxylated polyacrylamide.

A pre-mixture comprising polyacrylamide base polymer and glyoxal, produced on-site, was used. The pre-mixture was made by mixing 827 kg of softened process water, 144 kg of polyacrylamide base polymer and 18 kg of glyoxal in the reactor vessel. Temperature of the reaction pre-mixture was 23° C.

Sodium hydroxide (50% solution) was diluted with water to 2% concentration and pumped into the reactor vessel containing the pre-mixture. Two tests, OSG Test A and OSG Test B, were performed. NaOH 50% flow rate in OSG test A was 141 ml/h. NaOH 50% flow rate in OSG test B was 281 ml/h. Viscosity of the reaction mixture was measured by Anton Paar viscometer and the torque level of the Heidolph mixer was monitored as function of NaOH 50% dosage time. Measured viscosity and torque values in are shown in Table 1.

TABLE 1

Viscosity and torque values measured as function of feed of NaOH (50%) flow time.

| NaOH | OSG Test A | | OSG Test B | |
|---|---|---|---|---|
| flow time Minutes | Viscosity [cP] | Torque [Ncm] | Viscosity [cP] | Torque [Ncm] |
| 0 | 8.3 | 10.1 | 9.3 | 9.7 |
| 5 | — | — | 9.2 | 9.4 |
| 6 | 8.6 | 10.1 | — | — |
| 10 | 8.1 | 9.8 | 9.1 | 9.4 |
| 15 | 8.7 | 10.0 | 8.8 | 9.4 |
| 20 | 8.4 | 9.7 | 9.5 | 9.0 |
| 25 | 8.4 | 10.0 | 11.2 | 9.1 |
| 30 | 8.6 | 9.6 | 12.0 | 9.3 |
| 32 | — | — | 12.7 | 9.5 |
| 33 | — | — | 13.4 | 9.7 |
| 34 | — | — | 15.2 | 10.1 |
| 35 | 8.9 | 9.9 | 16.3 | 10.4 |
| 36 | — | — | 19.8 | 11.0 |
| 37 | — | — | 26.4 | 11.7 |
| 39 | — | — | 29.5 | 12.2 |
| 40 | 8.9 | 10.2 | 30.0 | 13.7 |
| 45 | 9.2 | 9.6 | — | — |
| 50 | 9.6 | 9.8 | — | — |
| 55 | 13.4 | 10.2 | — | — |
| 57 | 14.3 | 10.1 | — | — |
| 58 | 14.4 | 10.4 | — | — |
| 59 | 15.3 | 10.8 | — | — |
| 60 | 16.9 | 10.8 | — | — |
| 61 | 17.3 | 11.0 | — | — |
| 62 | 19.8 | 11.0 | — | — |
| 63 | 21.3 | 11.2 | — | — |
| 64 | 23.3 | 11.5 | — | — |
| 65 | 28.6 | 12.4 | — | — |
| 66 | 30.0 | 13.3 | — | — |

NaOH feed was stopped when viscosity of the reaction mixture reached 20 cP (at 62 min in OSG Test A, at 30 min in OSG Test B). The viscosity continued to increase after end of NaOH feed. Reaction mixture was acidified with 860 g sulfuric acid (37%) when the viscosity reached 30 cP.

After addition of acid the reaction mixture was mixed for 5 min. Thus obtained on-site produced aqueous polymer composition comprising glyoxylated polyacrylamide was transferred to a storage tank and the composition was analysed. The analysis results are given in Table 2. The calculated NaOH amounts for OSG Test A and OSG Test B are given in Table 3.

TABLE 2

Analysis results for aqueous polymer compositions comprising glyoxylated polyacrylamide, produced on-site in Example 1.

| Characteristics of obtained polymer composition | OSG Test A | OSG Test B |
|---|---|---|
| Dry content, wt-% | 4.8 | 4.8 |
| Viscosity at 25° C., cP | 34 | 36 |
| pH | 3.2 | 3.5 |
| Free glyoxal, wt-% | 0.47 | 0.47 |
| Glyoxylation time, min | 66 | 40 |

TABLE 3

Calculated NaOH amounts for Example 1.

| | OSG Test A | OSG Test B |
|---|---|---|
| NaOH 50% flow, ml/h | 141 | 281 |
| NaOH 100% dosage speed, g/h | 106 | 211 |
| NaOH 50% consumption, ml/ton reaction mixture | 155 | 187 |
| NaOH 100%, g/ton reaction mixture | 116 | 140 |

Example 1 shows that the glyoxylation reaction speed can be impacted by changing the speed of the alkali (NaOH)

feed. pH determination is not mandatory for glyoxylation reaction control when NaOH dosage speed is appropriately selected.

Example 2: On-Site Production of Glyoxylated Polyacrylamide, Feed of the Alkali Conducted in Portions The same reactor setup and the same reaction pre-mixture as in Example was used. The temperature of the pre-mixture was 23° C.

NaOH (50%) was pre-diluted to 2% solution with softened process water. The diluted NaOH solution was fed into the reaction mixture in 1 liter portions. Each 1 liter portion was fed under 10 min time. When feeding of one portion was completed, then there was 1 min delay time before the feeding of the next 1 liter portion was started. Feeding of NaOH 2% solution was stopped when viscosity reached 20 cP, whereafter the mixture was acidified with 750 g sulfuric acid (37%). Measured viscosity values as function of time are shown in Table 4.

TABLE 4

Viscosity values measured as function of time, portion wise feed of NaOH, as 2% solution. OSG Test C

| Time [min] | Added NaOH 2% [liter] | Viscosity [cP] |
|---|---|---|
| 0 | 0 | 8.1 |
| 11 | 1.0 | 9.2 |
| 22 | 2.0 | 7.8 |
| 33 | 3.0 | 8.9 |
| 44 | 4.0 | 8.8 |
| 55 | 5.0 | 9.3 |
| 66 | 6.0 | 11 |
| 75 | 6.8 | 20 |
| 81 | | 28 |
| 82 | | 30 |

The obtained on-site produced aqueous polymer composition comprising glyoxylated polyacrylamide was analysed. The analysis results are given in Table 5. The calculated NaOH amounts for OSG Test C are given in Table 6.

TABLE 5

Analysis results for aqueous polymer compositions comprising glyoxylated polyacrylamide, produced on-site in Example 2.

| Characteristics of obtained polymer composition | OSG Test C |
|---|---|
| Dry content, wt-% | 4.8 |
| Viscosity at 25° C., cP | 31 |
| pH | 3.6 |
| Free glyoxal, wt-% | 0.47 |
| Glyoxylation time, min | 82 |

TABLE 6

Calculated NaOH amounts for Example 2.

| | OSG test C |
|---|---|
| NaOH 2% flow, l/h | 5.4 |
| NaOH 100% dosage speed, g/h | 108 |
| NaOH 2% consumption, l/ton reaction mixture | 6.8 |
| NaOH 100%, g/ton reaction mixture | 136 |

It is seen from results of Example 2 that the feed of the alkali can also be dosed portion wise without pump when the total dosage speed remains slow enough and NaOH has appropriate time to get properly mixed.

It is apparent to a person skilled in the art that the invention is not limited exclusively to the examples described above, but that the invention can vary within the scope of the claims presented below.

The invention claimed is:

1. A method for on-site glyoxylation of polyacrylamide in a paper mill or board mill, where a discontinuous batch glyoxylation reaction of an aqueous reaction mixture is performed in a reactor vessel provided with a driven agitator to form an aqueous polymer composition comprising glyoxylated polyacrylamide for use in a manufacturing process of paper or board, the method comprising:

forming or obtaining the aqueous reaction mixture having a start viscosity and comprising polyacrylamide base polymer having a weight average molecular weight of 30 000-300 000 g/mol and glyoxal, wherein the concentration of the polyacrylamide base polymer in the reaction mixture is 1.5-8% above a Critical Concentration of the polyacrylamide base polymer;

optionally adjusting a temperature of the reaction mixture to a temperature range of 15-40° C.;

adding to the reaction mixture a feed of an alkali, measuring a viscosity of the reaction mixture and/or a process variable that is related to the viscosity of the reaction mixture;

allowing the on-site glyoxylation reaction of polyacrylamide base polymer in the reaction mixture to proceed;

ending the feed of the alkali when a predetermined end viscosity value is attained;

adding acid to the reaction mixture; and removing the aqueous polymer composition comprising glyoxylated polyacrylamide from the reaction vessel.

2. The method according to claim 1, wherein the aqueous polymer composition is transferred from the reaction vessel by a piping via optional storage vessels to the manufacturing process of paper or board.

3. The method according to claim 1, wherein the alkali is added to the reaction mixture in an amount of 40-500 g NaOH given per ton of the reaction mixture.

4. The method according to claim 1, wherein the polyacrylamide base polymer has a weight average molecular weight in a range of 50 000-300 000 g/mol.

5. The method according to claim 1, wherein the polyacrylamide base polymer is obtained by polymerisation of acrylamide and 3-50 mol-% of hydrolytically stable cationic monomers.

6. The method according to claim 1, wherein the reaction mixture has a solids content of 3-8 weight-%.

7. The method according to claim 1, wherein the on-site glyoxylation reaction has a feed period, which is in a range of 5-120 minutes for the feed of the alkali.

8. The method according to claim 1, wherein the polyacrylamide base polymer and glyoxal are provided as a pre-mixture for forming the reaction mixture.

9. The method according to claim 1, wherein the temperature of the reaction mixture is measured throughout the glyoxylation reaction, and optionally adjusted.

10. The method according to claim 1, wherein the viscosity of the reaction mixture is measured by measuring torque of the motor-driven agitator.

11. The method according to claim 1, wherein the viscosity of the reaction mixture is measured from the reaction mixture by using rotational viscometer, oscillating viscometer or vibrational viscometer.

12. The method according to claim 1, wherein the start viscosity of the reaction mixture is in a range of 4-15 cP.

13. The method according to claim 1, wherein the feed of the alkali is ended when the viscosity of the reaction mixture is increased by at least 20% from the start viscosity value.

14. The method according to claim 1, wherein after addition of the acid the viscosity of the reaction mixture is in a range of 20-60 cP.

15. The method according to claim 1, wherein after addition of the acid the viscosity of the reaction mixture is 2-7 times the start viscosity of the reaction mixture.

* * * * *